(12) United States Patent
Moyses et al.

(10) Patent No.: US 6,405,643 B1
(45) Date of Patent: Jun. 18, 2002

(54) CREAM DEPOSITORS

(75) Inventors: Thomas Moyses, Peterborough; Martyn Thomas Wray, Stamford, both of (GB)

(73) Assignee: APV Systems Limited, Sussex (GB)

( * ) Notice: Subject to any disclaimer, the term of this patent is extended or adjusted under 35 U.S.C. 154(b) by 0 days.

(21) Appl. No.: 09/508,226

(22) PCT Filed: Sep. 9, 1998

(86) PCT No.: PCT/GB98/02667

§ 371 (c)(1),
(2), (4) Date: Jul. 10, 2000

(87) PCT Pub. No.: WO99/12427

PCT Pub. Date: Mar. 18, 1999

(30) Foreign Application Priority Data

Sep. 9, 1997 (GB) ............................................. 9718978

(51) Int. Cl.[7] ............................................. A21C 15/00
(52) U.S. Cl. .................... 99/450.4; 99/450.7; 425/113; 425/310; 425/381; 425/382 R; 118/25
(58) Field of Search .............................. 99/450.4, 450.6, 99/450.7, 450.8, 450.5; 425/112, 113, 308, 381, 382 R, 310, 382.3, 463; 118/25, 30, 313; 426/516

(56) References Cited

U.S. PATENT DOCUMENTS

| 2,679,811 | A | * | 6/1954 | Knee | 99/450.4 |
| 3,762,305 | A | * | 10/1973 | Glackin | 99/450.4 |
| 4,615,264 | A | * | 10/1986 | Rose | 99/450.4 |
| 4,708,054 | A | * | 11/1987 | Newbery et al. | 99/450.4 |
| 5,974,958 | A | * | 11/1999 | Lilley et al. | 99/450.4 |

FOREIGN PATENT DOCUMENTS

GB            971758 A   * 10/1964 ................. 99/450.4

* cited by examiner

Primary Examiner—Reginald L. Alexander
(74) Attorney, Agent, or Firm—Kevin A. Oliver; Foley, Hoag & Eliot LLP

(57) ABSTRACT

A cream depositor assembly has a depositor body in the form of a rotatable cylindrical stencil (11) provided with axially-spaced sets of circumferentially-spaced outlet ports (12). A recirculatory cream supply to the depositor body has a cream feed duct (27) fed by a pump (25), and a cream return duct (28). A cream diverting means (14) is housed within the interior of the stencil (11) and is operative to divert part of the cream flow from the feed duct (27) to an outlet passage (28), to supply the stencil. The illustrated diverting means (14) employs a flexible impeller (36), mounted eccentrically within a cylindrical rotor chamber, but a gear pump may be used.

5 Claims, 1 Drawing Sheet

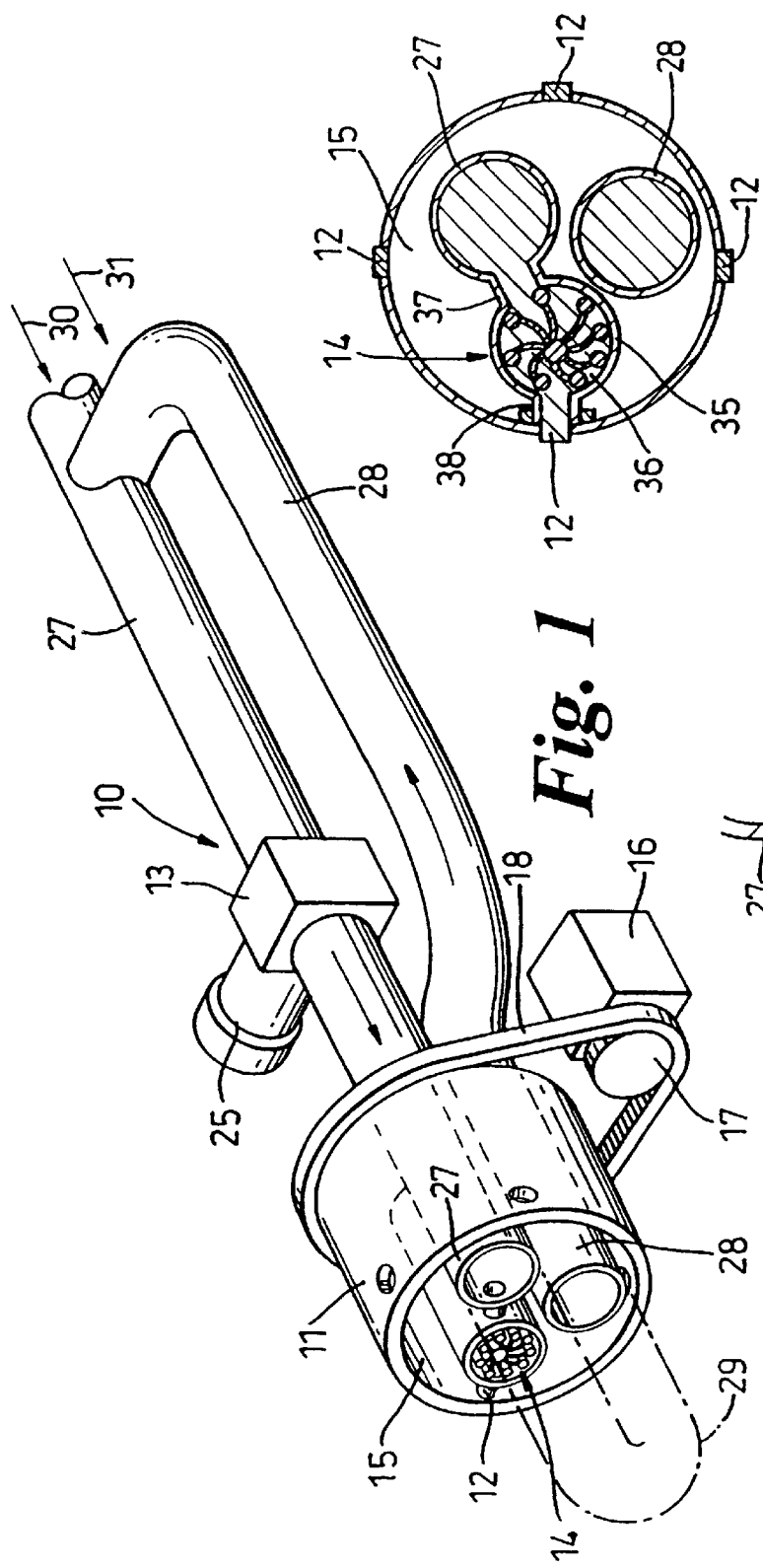

CREAM DEPOSITORS

BACKGROUND

This invention relates to cream depositors and is particularly, but not exclusively, concerned with cream depositors for depositing a layer of cream between a pair of biscuit shells for forming biscuit sandwiches.

RELATED ART

As used herein, the term 'biscuit' is intended to include cookies, crackers and like planar products, and the term 'cream' is intended to include other edible flowable materials such as confectionery or jams.

SUMMARY OF THE INVENTION

According to one aspect of the present invention a cream depositor assembly comprises a depositor body having a plurality of cream outlet ports, means for circulating a flow of cream through the interior of the depositor body, and diverting means for diverting part of said flow to said outlet ports.

The diverting means is preferably housed within the interior of the depositor body.

The depositor body may comprise a rotatable stencil and the means for diverting part of said flow to said outlet ports may comprise one or more rotors.

The rotor of the diverting means may comprise a flexible impeller which is mounted eccentrically within a rotor chamber.

The means for circulating said flow of cream may comprise ducting extending through the depositor body and a pump outside the depositor body incorporated in said ducting.

That part of the ducting extending through the depositor body may be of U-shape.

BRIEF DESCRIPTION OF THE SEVERAL VIEWS OF THE DRAWINGS

The invention will now be further described by way of example only, with reference to the accompanying drawings, wherein:

FIG. 1 is a schematic perspective view of the cream depositor with part of the stencil cut away, FIG. 2 is a vertical cross-section of the depositor body of FIG. 1, FIG. 3 is a cut-away view in perspective, which illustrates part of the cream depositor shown in FIG. 1,

DESCRIPTION OF ILLUSTRATED EMBODIMENT

FIG. 1 shows a cream depositor assembly 10, comprising a hollow cylindrical depositor body 11 having a plurality of cream outlet ports 12, means 13 for circulating a flow of cream through the interior 15 of the depositor body 11, and diverter means 14 for diverting part of said flow 15 to said outlet ports 12.

The depositor body 11 comprises a rotatable stencil, driven by a motor 16 by way of a toothed wheel 17 and a toothed belt 18.

Sets of the cream outlet ports 12 are provided at spaced intervals along the axial length of the depositor body 11 so as to correspond to lanes of endless conveyors (not shown) on which the biscuit shells (not shown) are transported.

The means 13 for circulating a flow of cream through the interior 15 of the depositor body or stencil 11 comprise ducting extending through the stencil from the exterior thereof, and a pump 25 in the ducting.

The ducting comprises a feed section 27, a return section 28 and an elbow section 29 coupling sections 27 and 28, whereby the ducting is of U-shaped form. A make-up supply of cream is indicated by arrow 30.

The diverter means 14 comprise a duct 35 disposed within the stencil 11, spaced from but substantially parallel to, the feed duct 27. Flexible rotors 36 are disposed within the duct 35, at intervals corresponding to each lane of biscuit shells. The rotors 36 are mounted on a common drive shaft 32 driven by a belt drive (not shown). Each rotor 36 is provided with a plurality of flexible vanes 39 which extend out from the drive shaft 32. Each vane 39 is provided with a sealing head 40 which ensures a seal with the inner surface of the duct 35. The drive shaft 32 is mounted eccentrically with respect to the central axis of the cylindrical duct 35 and towards respective outlet passageways 38.

Suitable flexible rotors are available from ITT Jabsco® as flexible impellers which form part of their flexible impeller pumps. Typically the rotors are made of neoprene rubber, but other materials may be used according to the viscosity of the cream material to be handled.

Inlet passageways 37 interconnect the ducts 35 and 27 at said intervals. The ducts 35 have outlet passageways 38 also at said intervals, and alignable with the stencil outlets 12, as the stencil 11 rotates.

In use. biscuit shells (not shown) are transported on endless belts, chains or other conveyor means (not shown) beneath the cream depositor 10, whereby cream layers are deposited on the biscuit shells as the depositor body 11 rotates.

With reference once more to FIG. 1, cream is continuously circulated through the feed and return ducts 27, 28 by the pump 13, to be discharged through the outlet ports 12 of the rotating stencil 11. Substantially more than that required to be deposited is actually circulated, for example, about 130%. This arrangement allows cream to be recirculated should the cream depositor 11 or associated machinery have to be stopped for any reason, thus avoiding deterioration of the cream and setting off, whereby crystallisation or hardening takes place.

The arrangement is also advantageous should other depositing materials, such as chocolate or caramel, be used.

With the cream depositor or associated machinery stopped, rotation of the stencil 11 is stopped as well, in a position where discharge through an outlet port 12 cannot take place.

As an alternative to a flexible rotor 36 a gear pump, comprising a pair of intermeshing rotors, may be used. The single rotor 36 is less expensive, however. A gear pump may be required for handling highly viscous materials.

What is claimed is:

1. A cream depositor assembly comprising
   (a) a rotatable stencil
   (b) a plurality of cream outlet ports dispersed about a circumference of the body
   (c) a circulator arranged for circulating a flow of cream through the interior of the stencil and
   (d) at least one rotor for diverting cream from the flow to the outlet ports, said rotor having a flexible impeller mounted eccentrically within a respective rotor chamber.

2. A cream depositor assembly comprising
(a) a depositor body having a plurality of cream outlet ports
(b) ducting having a substantially U-shape part extending through the depositor body
(c) a pump outside the depositor body and incorporated into the ducting to cause a circulating flow of cream in the ducting and
(d) a diverter arranged for diverting part of the flow in the ducting to the outlet ports.

3. A cream depositor comprising
(a) a depositor body having a plurality of cream outlet ports
(b) a feed duct extending through the interior of the depositor body for supplying cream to the interior of the depositor body from a cream supply, said feed duct having a feed duct inlet connected to the cream supply
(c) a diverter arranged for diverting part of the flow of cream in said feed duct to said outlet ports, and
(d) a return duct extending through the interior of the depositor body and connected at a first end to the feed duct so as to receive excess cream that has not been diverted by said diverter to said outlet ports and further connected at a second end to the feed duct inlet to return that excess cream to said feed duct inlet.

4. A depositor assembly as claimed in claim 3 wherein the depositor body comprises a rotatable stencil and the diverter comprises one or more rotors.

5. A depositor assembly as claimed in claim 4 wherein each rotor of the diverter comprises a flexible impeller mounted eccentrically within a respective rotor chamber.

* * * * *